US007453845B2

(12) United States Patent
Cha et al.

(10) Patent No.: US 7,453,845 B2
(45) Date of Patent: Nov. 18, 2008

(54) DISTRIBUTED CALL CONTROL

(75) Inventors: Inhyok Cha, Branchburg, NJ (US);
Fang-Chen Cheng, Randolph, NJ (US);
Teck H. Hu, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1257 days.

(21) Appl. No.: 10/290,646

(22) Filed: Nov. 8, 2002

(65) Prior Publication Data

US 2004/0090934 A1 May 13, 2004

(51) Int. Cl.
*H04Q 7/00* (2006.01)
*H04Q 7/28* (2006.01)
*H04Q 7/20* (2006.01)
*G08C 15/00* (2006.01)
*H04J 3/16* (2006.01)
*H04J 1/02* (2006.01)
*H04M 1/00* (2006.01)
*H04B 7/00* (2006.01)

(52) U.S. Cl. ............... 370/329; 370/230; 370/341; 370/468; 370/493; 370/437; 455/464; 455/522; 455/550.1; 455/560; 455/561; 455/556.2

(58) Field of Classification Search ... 455/452.1–452.2, 455/422.1, 550.1, 556.2, 67.11, 63.1, 62, 455/403, 450–451, 453, 466, 509–514, 515–517, 455/524–525, 560–561, 13.4, 68–69, 70, 455/418–421, 439, 464, 522; 370/328–330, 370/395.21, 395.3, 395.52, 395.65, 264, 370/338, 437, 450, 468, 203–204, 230, 233–236, 370/332, 335–350, 441–443, 461–462, 477–496, 370/543, 913, 431; 719/314, 322, 327; 348/14.01–14.02

See application file for complete search history.

(56) References Cited

U.S. PATENT DOCUMENTS

| 5,608,727 | A | 3/1997 | Perreault et al. ............ 370/462 |
|---|---|---|---|
| 6,078,824 | A * | 6/2000 | Sogo ....................... 455/562.1 |
| 6,771,965 | B2 * | 8/2004 | Hamabe ..................... 455/442 |
| 6,880,103 | B2 * | 4/2005 | Kim et al. ..................... 714/18 |
| 6,912,403 | B2 * | 6/2005 | Ahmad et al. ............... 455/522 |
| 6,944,125 | B1 * | 9/2005 | Salmanian ................. 370/232 |
| 6,975,609 | B1 * | 12/2005 | Khaleghi et al. ............ 370/335 |
| 6,993,294 | B2 * | 1/2006 | Nobukiyo et al. ........ 455/67.11 |
| 7,133,688 | B2 * | 11/2006 | Das et al. .................... 455/522 |
| 2002/0119799 | A1 * | 8/2002 | Moulsley et al. ............ 455/525 |
| 2003/0067897 | A1 * | 4/2003 | Black ........................ 370/335 |
| 2003/0189915 | A1 * | 10/2003 | Miller ....................... 370/343 |
| 2003/0207696 | A1 * | 11/2003 | Willenegger et al. ........ 455/522 |
| 2004/0203980 | A1 * | 10/2004 | Das et al. .................... 455/522 |

FOREIGN PATENT DOCUMENTS

EP 1 237 296 A2 9/2002

OTHER PUBLICATIONS

Europear Search Report.

* cited by examiner

*Primary Examiner*—Meless N Zewdu

(57) ABSTRACT

A method for dynamically varying the allocation and distribution of a base station's resources in response to fluctuations in demand for services. The method includes transmitting a status signal from a base station to a base station controller over an $I_{ub}$ interface. The status signal may correspond to the demand of the base station's transmit power for a data transmission service, such as HSDPA, and for at least another service, such as a dedicated voice channel. In response to receiving the usage information signal, the base station controller may vary the transmit power of the base station allocated for HSDPA and/or for the dedicated voice, data and/or both integrated voice and data channel. In response to receiving users' status information for HSDPA services, the base station controller may vary its call admission status for HSDPA and/or dedicated voice, data and/or both integrated voice and data users.

5 Claims, 2 Drawing Sheets

DISTRIBUTED CALL CONTROL

BACKGROUND OF THE INVENTION

I. FIELD OF THE INVENTION

The present invention relates to data communications.

II. DESCRIPTION OF THE RELATED ART

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. Several approaches have been developed for defining links or channels in a cellular communication system. These schemes include, for example, TDMA (time-division multiple access), and CDMA (code-division multiple access).

In TDMA communication systems, the radio spectrum is divided into time slots. Each time slot allows only one user to transmit and/or receive. Thusly, TDMA requires precise timing between the transmitter and receiver so that each user may transmit their information during their allocated time.

In CDMA communications systems, different wireless channels are distinguished by different channelization codes or sequences. These distinct channelization codes are used to encode different information streams, which may then be modulated at one or more different carrier frequencies for simultaneous transmission. A receiver may recover a particular stream from a received signal using the appropriate code or sequence to decode the received signal.

Referring to FIG. 1, a typical network 10 supportive of wireless communications is shown. Here, network 10 may accommodate one of a number of architectures, including Universal Mobile Telecommunications System ("UMTS"), for example. Network 10 may be divided into a radio access network ("RAN") 12 and a core network 14. RAN 12 includes equipment used to support wireless interfaces 16a and 16b between a wireless unit 18a and 18b and network 10. RAN 12 further comprises a plurality of Node Bs or base stations 20a through 20c, as well as a number of radio network or base station controllers ("RNC") 22a and 22b. The signaling exchange between the Node Bs and RNCs is commonly referred to as the $I_{ub}$ interface, while the interface between RNCs themselves is commonly referred to as the $I_{ur}$ interface. The transport mechanism of both the $I_{ub}$ and $I_{ur}$ interfaces is generally based on asynchronous transfer mode ("ATM").

Core network 14 includes network elements that support circuit based communications, as well as packet-based communications. In establishing a circuit channel to handle circuit-based communications between the wireless unit 18b and a public switched telephone network ("PSTN") 24 or another wireless unit, base station 20b receives (in the uplink) and transmits (in the downlink), the coded information (circuit voice or circuit switched data) over the wireless interface or link 16b. RNCs 22a and 22b may each perform a number of functions, including frame selection, encryption, and handling of access network mobility, for example. In the above example, RNC 22b may forward the circuit voice and circuit switched data over a network, such as an asynchronous transfer mode ("ATM")/Internet Protocol ("IP") network to a mobile switching center ("MSC") 30. MSC 30 is responsible for call processing and macromobility on the MSC level. MSC 30 establishes the connectivity between wireless unit 18b and PSTN 24.

In establishing a packet channel to handle packet-based communications between wireless unit 18a and a packet data network ("PDN") 34, such as the Internet, base station 20a receives (in the uplink) and transmits (in the downlink), the coded information over the wireless interface or link 16a. In the uplink direction, RNC 22a reassembles the packets as sent by wireless unit 18a and forwards them to an SGSN 40. In the downlink direction, RNC 22a receives the packets and segments them into the right size packet to be transferred to the base station, which may perform its processing and the data across the wireless link 16a. SGSN 40 provides packet data session processing and macromobility support for network 10. SGSN 40 establishes connectivity between wireless unit 18a and PDN 34. A GGSN 42 is the gateway to external PDNs. GGSN 42 acts upon requests from SGSN 40 for packet data protocol (PDP) session establishment.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems, such as those employing High Speed Downlink Packet Access ("HSDPA"), are expected to provide premium data services in support of Internet access and multimedia communication. Unlike voice, however, data communications may be potentially bursty yet relatively delay tolerant. The system for data communications, as such, may not be efficient with dedicated links on the downlink or the uplink. A more efficient data communication system may be enabled if the system employs one or more channels to be shared by a number of wireless units. By this arrangement, each of the wireless units on the downlink shares available resources, where the downlink transmission is scheduled to the user(s) through a resource management process. Resources to be managed in the downlink include, for example, the allocated transmit power by the Node B, the channelization codes, and/or the interference created by each user to other users in the same sector or cell, as well as in other sectors or cells.

The general management of resources on the downlink at a Node B offering HSDPA services is performed by a radio network controller—RNC 22a and/or RNC 22b in FIG. 1, for example. More particularly, an RNC determines the allocation of transmit power, for example, for each Node B supporting HSDPA services. Thusly, the distribution of a Node B's resources between HSDPA and non-HSDPA applications is determined by the RNC. For the purpose of the present disclosure, non-HSDPA applications include voice and other non-delay tolerant traffic services, which are afforded priority by the RNC over HSDPA services by means of dedicated channels. Consequently, an exemplary RNC may determine to allocate seventy percent (70%) of a Node B's power for voice services, for example, and thusly a maximum of thirty percent (30%) for HSDPA services.

Over time, however, the allocation and distribution of the resources between voice and HSDPA services may require modification. The demand for voice services, however, may diminish in comparison with the need for resources to support HSDPA services. For example, the demand for voice services may drop such that a Node B may only require forty percent (40%) of the transmit power. The efficiency of the Node B's transmit power, thusly, may become an issue of concern if, in this example, the HSDPA services are not allowed to employ the unused voice services transmit power.

Presently, any changes to the allocation and distribution are made statically by the RNC, in a centralized manner. The static nature of these changes may take a considerable period of time. This time lag may be attributed, for example, to the need for measuring and assessing the statistical usage of voice and/or HSDPA services over hours and/or days. This is further buttressed by the relatively high latency period between the RNC and the Node B. For example, a measurement inquiry might first be initiated by the RNC to the Node B, and the response to such an inquiry thereafter might be transmitted by the Node B back to the RNC. Only after these measurements are performed might the RNC determine that the allocation and distribution inefficient, before the appropriate changes are made.

Consequently, the present centralized allocation and distribution of the Node B's control resources by the RNC is inefficient and time consuming given the potential fluctuations in the demand for services. Therefore, a need exists for a more efficient method to facilitate changes in the management of a base station's resources in response to changes in demand for services.

SUMMARY OF THE INVENTION

The present invention provides a method for dynamically changing the allocation and distribution of a base station's resources in response to fluctuations in the demand for services. More particularly, the present invention provides a decentralized method for reallocating the resources of the base station. The present invention's decentralized approach relies on the base station's ability to ascertain the efficiency of the resource allocation determined by the base station controller.

In an embodiment of the present invention, a status signal is transmitted to effectuate a change in the base station's resource allocation in response to fluctuations in the demand for the services offered, such as voice and HSDPA, for example. This signal may be transmitted by the base station to the base station controller. The signal may correspond with a need for the base station controller to increase the power allocated to the base station for HSDPA services, while decreasing the power allocated for non-HSDPA services, or the vice versa, for example. This signal may be prompted by the base station's monitoring of the user demand for services offered in view of the resources allocated for each service.

In another embodiment of the present invention, a status signal is initiated and transmitted by the base station. The status signal comprises one or more measurements associated with the resources allocation for services, such as voice and HSDPA, for example, offered by the base station. These one or more measurements may be self-determined by the base station. This status signal may be transmitted periodically and/or upon the utilization of resources rising above and/or falling beneath a threshold, for example.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention pertains to a method for dynamically changing the allocation and distribution of a base station's resources. The present invention employs a decentralized approach for reallocating the resources of the base station in response to usage. As will detailed hereinbelow, the base station provides usage information in the form of a signal that may comprises measurements to its associated base station controller. This usage information corresponds with the demand for each of the services in view of the resources initially allocated for each service. In so doing, the base station controller may vary the allocation of the base station's resources, such as transmit power, for each service.

Figure 1:
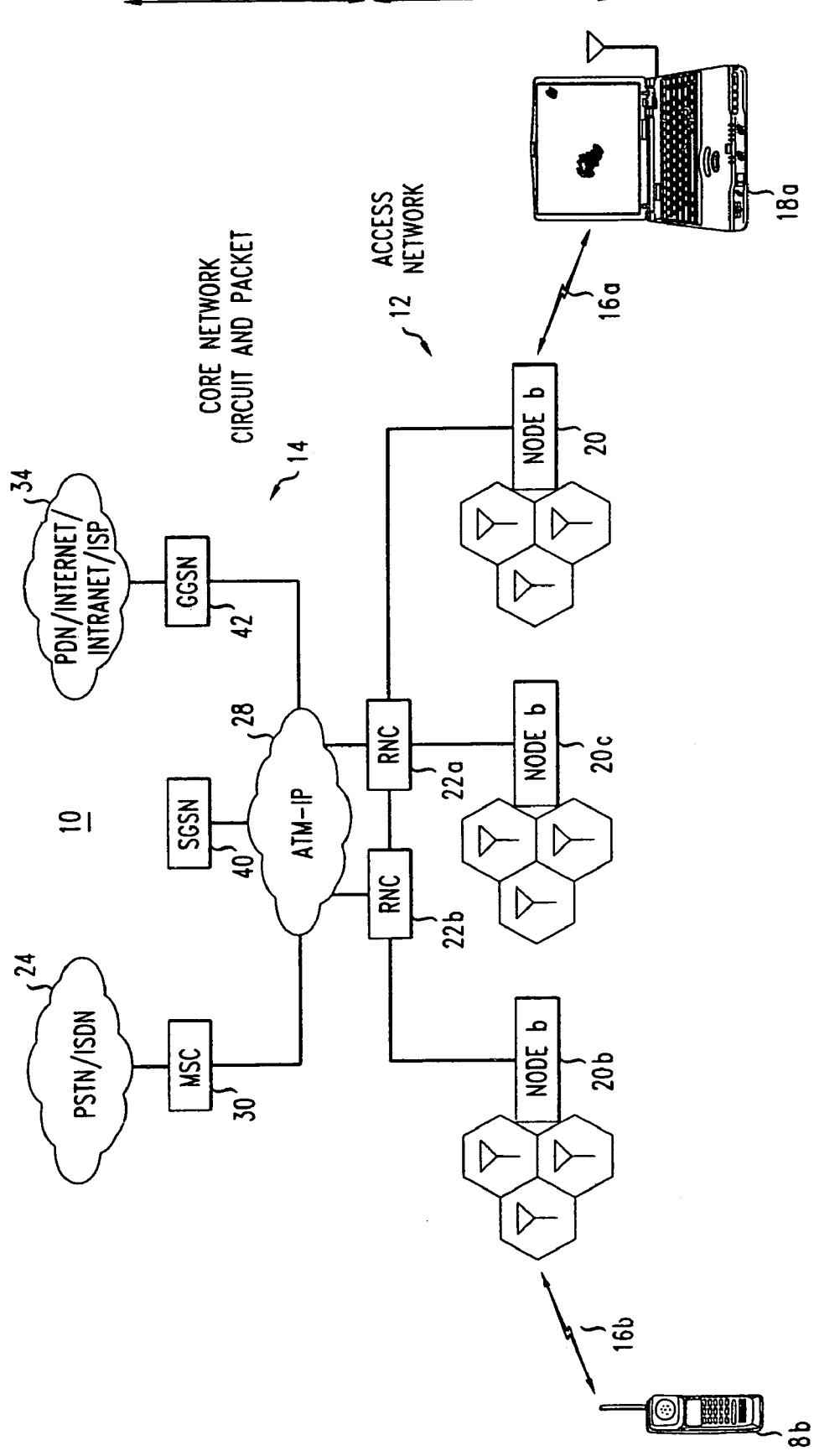
FIG. 1 depicts a block diagram of a known network architecture.
Figure 2:
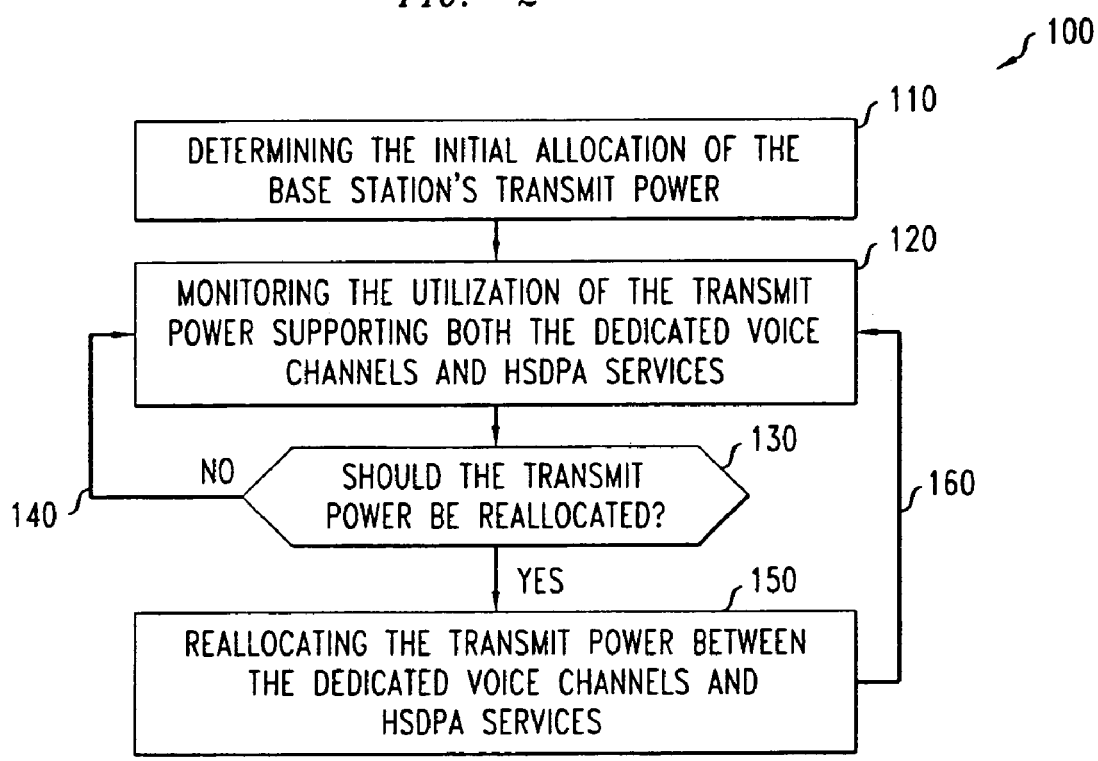
FIG. 2 depicts an embodiment of the present invention.

Referring to FIG. 2, a flow chart depicting an embodiment of the present invention is illustrated. More particularly, a method (100) is shown for varying a base station's resources, such as transmit power, for example, in response to fluctuations in the demand by wireless users for data transmission services and one or more other services. For the purposes of the present embodiment, the data transmission service is realized by HSDPA, while the other service at least includes voice applications employing one or more dedicated channels. Consequently, the present embodiment may enable greater allocation of resources in support of HSDPA services, for example, in the event that the transmit power required for supporting wireless users accessing the dedicated channel(s) for voice services is less than initially allocated. Similarly, the present embodiment may enable greater allocation of resources in support of dedicated channel(s) for voice services, for example, if the resources required for supporting users accessing HSDPA services is less than first allocated.

Initially, the base station controller determines the distribution of the base station's transmit power, for example, amongst the services offered (110). Given that voice applications generally take priority over data applications, and more particularly over data packet applications, a larger percentage of the transmit power may, at first, be allocated to support wireless users of one or more base station's dedicated voice channels (e.g., or dedicated voice, data and/or both integrated voice and data channels, when comparing with merely data packet applications). The remainder, of the transmit power, thereafter, is allocated to support wireless users accessing the HSDPA services of base station. Once this determination is completed, the base station controller communicates to the base station the initial allocation of transmit power between the dedicated voice channels and HSDPA services via an $I_{ub}$ interface coupling the base station controller with the radio access network.

Subsequently, the base station monitors the utilization of the transmit power in support of dedicated voice channels and HSDPA services (120). This step of monitoring involves assessing the demands of the wireless users for the services offered by the base station. Here, the transmit power in use is examined for each service. This examination is made in light of the initial resource allocations determined by the base station controller. As such, the base station may deduce a percentage of the usage or the like from the initial allocations.

Once the usage of the transmit power for each service is ascertained in comparison with the initial allocations, the base station may transmit a corresponding status signal to the base station controller. The status signal is configured to correspond with the monitored demand for the dedicated voice channels and HSDPA services. In one example, the status signal also includes resource measurement information for the dedicated voice channels and HSDPA services. The status signal is transmitted using the $I_{ub}$ interface to trigger the reallocation of greater base station resources for one service over another service, taking into consideration the utilization of both. It should be noted that the status signal might also identify the status of users accessing the dedicated voice channel(s) and/or HSDPA services.

In one example, an initial allocation for the dedicated voice channels is seventy percent (70%) of the available base station transmit power. The transmit power in support of the dedicated voice channels, however, may be only forty percent (40%). As a result, the status signal is transmitted by the base station to notify the base station controller that the users seeking access to the base station's HSDPA services may benefit from greater transmit power allocation than the original thirty percent (30%) allocated thereto. In this scenario, the number and/or the demands of users for HSDPA services may raise the need for reallocating some of the potential unused transmit power from the dedicated voice channels.

It should be noted, however, that the converse might also be true. Here, the status signal may notify the base station controller that the number and/or the demands of the users accessing the base station's dedicated voice channels may be significantly greater than the initial allocation anticipated. Consequently, the status signal may raise the need for reallocating some of the unused transmit power from allocated to support HSDPA services.

After the status signal is received by the base station controller, a determination is made as to whether reallocation of the base station's transmit power is necessary (130). Here, the utilization of the initial allocated transmit power for the dedicated voice channel(s) and/or HSDPA services, as may be found within the status signal, are examined by the base station controller. The base station controller may also examine a number of additional factors, including particular traffic patterns. Moreover, the base station controller may also consider whether a majority of the users accessing the dedicated voice channel(s) or HSDPA services are premium paying customers with additional benefits/privileges.

If the base station controller determines that, for example, the utilization of the initial allocated transmit power falls beneath a trigger threshold, no reallocation is performed. A feedback loop (140) directs the flow chart back to the body of the method (100). More particularly, the feedback loop (140) supports the base station in its continued monitoring of the utilization of the transmit power in support of dedicated voice channels and HSDPA services (120).

Alternatively, the base station controller may determine that the utilization of the initial allocated transmit power falls above a trigger threshold (160). In this circumstance, the base station controller reallocates and redistributes the base station's transmit power more effectively in support of users accessing the dedicated voice channels and/or HSDPA services. As a result, the base station may have, for example, unused transmit power allocated for HSDPA services. Consequently, the initial allocation of transmit power for the High Speed Downlink Packet Access may be increased by means of this determination. This increase in transmit power allocation for HSDPA, however, is the result of a decrease in the transmit power utilization for the dedicated voice channel(s) from the resources initial allocated. Similarly, the initial allocation of transmit power for the High Speed Downlink Packet Access may alternatively decrease as the demand for the dedicated voice channel increases.

Once the base station's transmit power has been reallocated and redistributed (150), a first pass of the method (10) is generally complete. However, to facilitate the continued dynamic allocation and distribution of the base station's transmit power, method (10) employs a second feedback loop (160). This second feedback loop (140) transfers control of the method (10) back to continued monitoring of the utilization of the transmit power in support of dedicated voice channels and HSDPA services by the base station (120).

Figure 3:
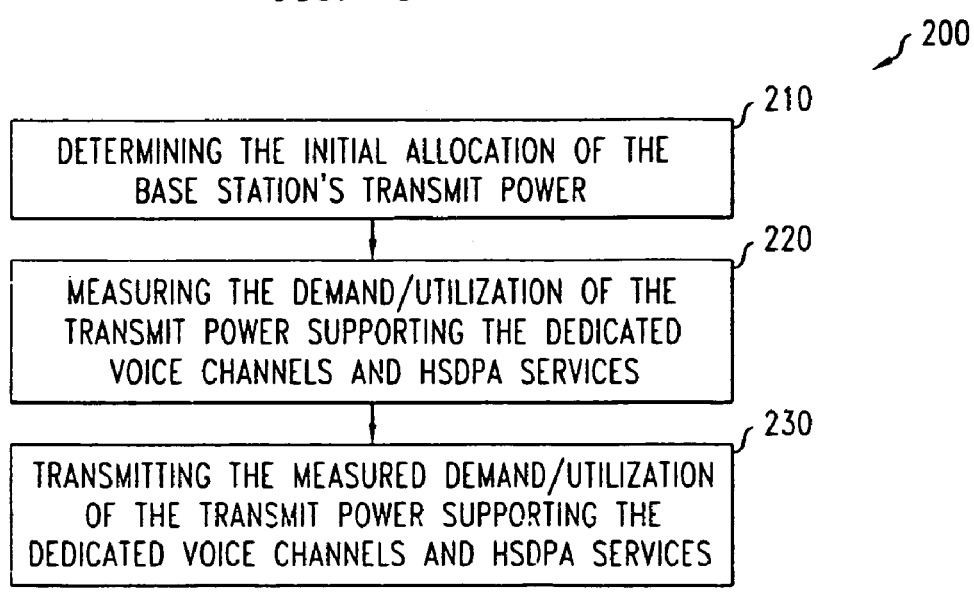
FIG. 3 depicts another embodiment of the present invention.

Referring to FIG. 3, a flow chart depicting an embodiment of the present invention is illustrated. More particularly, a method (200) is shown for communicating the usage of the base station's resources, namely the transmit power, to the base station controller. This communication may effectuate changes in the allocation of the transmit power, for example, between dedicated voice channels and HSDPA services.

Initially, the base station controller determines the distribution of the base station's transmit power, for example, amongst the services offered (210). Given that circuit switching applications (e.g., dedicated voice or data applications) generally take priority over packet-switching data applications (e.g., HSDPA services), a larger percentage of the transmit power may, at first, be allocated to support wireless users of one or more base station's dedicated voice channels. The remainder, of the transmit power, thereafter, is allocated to support wireless users accessing the HSDPA services of base station. Once this determination is completed, the base station controller communicates to the base station the initial allocation of transmit power between the dedicated voice channels and HSDPA services via an $I_{ub}$ interface coupling the base station controller with the radio access network.

Subsequently, the base station measures the utilization of the transmit power allocated in support of dedicated voice channels and HSDPA services (220). This step of measuring involves assessing the demands of the wireless users for the services offered by the base station. More particularly, the transmit power used is measured for each service against the amount allocated for that each service. Consequently, various statistics regarding the efficiency of transmit power usage may be deduced by the base station.

It should be noted that the step of measuring may be self-determined by the base station. As such, the initiation of the measuring step may be triggered by the passage of a regular time interval (e.g., the measuring step being periodic). Alternatively, the measuring step may be triggered by the efficiency of transmit power usage rising above or falling beneath a threshold, for example.

Thereafter, a status signal containing the results of the measuring step may be transmitted over the $I_{ub}$ interface (230). The status signal is configured to correspond with the results of measuring step (220). The status signal is transmitted using the $I_{ub}$ interface. It should be noted that the status signal might also identify users accessing the dedicated voice channel(s) and/or HSDPA services.

In response to receiving the status signal, the base station controller may determine that the initial allocation of transmit power for each service may require a modification. In this circumstance, the base station controller may redistributes the base station's transmit power more effectively in support of users accessing the dedicated voice or data channels and/or HSDPA services. As a result, the base station may increase the transmit power allocated for HSDPA services or the dedicated voice channel(s).

Exemplary System

In an example of the present invention, a new reconfiguration message initiated by the Node B to the CRNC is transmitted to request the reallocation of the maximum power allocated for HSDPA services (hereinafter "HSDPA_Power"). This new reconfiguration message facilitates efficient power sharing between HSDPA and DCHs users so that the Node B may exploit the maximum available transmitted power allocated to the cell. Alternatively, a total removal of the upper limit for the HSDPA_Power may also be considered.

Each HSDPA user associated with a downlink DCH may be provided with control information, such as TPC, TFCI, and pilot bits. Similarly, the same information may be sent back in the uplink in the UL-DPCCH. Therefore, the admission and set up of each HSDPA user may employ both code and power resources, even if the HSDPA user is not being scheduled for data transmission. The CRNC may receive the following feedback from the Node B that may assist in the CAC of the HSDPA users:

(1) Minimum required power and code resources needed for each Guaranteed Bit Rate ("GBR") requirement; and
(2) The Node B also reports the currently scheduled or provided bit rate per priority class (averaged over all users).

Based on the required GBR of the new HSDPA user, using the feedback information of (1) and (2), the CAC may be able to determine if there is sufficient power and codes to serve the new user. If a user with lower priority has been getting bit rate lower than its required GBR, then the user may not be admitted by the CAC. GBR is particularly of note with respect to streaming type applications. For users with Interactive and Background traffic classes, GBR may not be required. Consequently, the CAC may make a decision to admit or reject based on the available resources and priority of the users.

Currently, because the CAC is performed at the CRNC, the Node B may have limited control over the users that have been accepted by the CRNC. In this scenario, a drop in the usage of HSDPA resources at the Node B may be facilitated. The power measurement feedback through $I_{ub}$ signaling may enable the CRNC to reduce the HSDPA_Power. Alternatively, the Node B may signal the CRNC to reduce the HSDPA resources or report to the CRNC, a list of users that have been getting very infrequency or low levels of service. The users with very infrequent or low levels of HSDPA services experience excessive delay(s) and thus may exceed the minimum delay quality of service ("QoS") requirements defined in the respective service classes. The excessive delay may trigger the time-out at the upper layer error-and-flow control protocol. The upper layer error-and-flow control protocol would generate replica data traffic to the Node B. This may lead to increasing the backlog of the users with the low-level HSDPA services that have to be serviced by the Node B.

With the proposed mechanism, the CRNC may then decide whether the services for these very low-level service users should be taken out to conserve resources that might be directed to users of dedicated channels. Thus, the current mechanism clearly is not sufficient and could be refined. Moreover, a user with GBR that may not be satisfied by the Node B scheduler. The Node B may inform the CAC to take appropriate actions. For example, the Node B may signal the CAC to increase resources allocated for the HSDPA or re-negotiate the GBR for the particular user.

In view of these shortcomings, it would be beneficial to relocate to the Node B control of some of the HSDPA CAC functions currently held by the CRNC. This is particularly the case given that the Node B implements the radio resource management for the HSDPA resources through smart scheduling or resource management of the HSDPA users and controls the HARQ mechanism for QoS assurance. A distributed functionality for the HSDPA CAC to the Node B may enable efficient and effective radio resource management that might facilitate the fast scheduling at the Node B for HSDPA.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments falling within the true scope of the invention.

The invention claimed is:

1. A method of communication comprising: transmitting a status signal, from a base station, for varying at least one resource of the base station allocated to a data transmission service in response to fluctuations in demand for at least another service, wherein the at least one resource comprises transmit power of the base station, wherein an initial allocation of the transmit power of the base station is determined for the data transmission service and for the another service, wherein the data transmission service comprises High Speed Downlink Packet Access and the another service comprises at least one dedicated voice, data and/or both integrated voice and data, and wherein the status signal identifies users of the High Speed Downlink Packet Access and/or the dedicated voice, data and/or both integrated voice and data.

2. A method of communication comprising: transmitting a status signal, from a base station, for varying at least one resource of the base station allocated to a data transmission service in response to fluctuations in demand for at least another service, wherein the at least one resource comprises transmit power of the base station, wherein an initial allocation of the transmit power of the base station is determined for the data transmission service and for the another service, wherein the data transmission service comprises High Speed Downlink Packet Access and the another service comprises at least one dedicated voice, data and/or both integrated voice and data, and wherein the initial allocation of transmit power for the High Speed Downlink Packet Access is increased as the demand for the dedicated voice, data and/or both integrated voice and data decreases and/or the initial allocation of transmit power for the High Speed Downlink Packet Access is decreased as the demand for the dedicated voice channel increases.

3. A method for changing an allocation of at least one base station resource comprising:
   selecting an initial allocation of the at least one base station resource for a data transmission service and for at least another service, wherein the at least one base station resource comprises transmit power of the base station and wherein the data transmission service comprises High Speed Downlink Packet Access and the another service comprises at least one dedicated voice, data and/or both integrated voice and data, wherein an initial allocation of transmit power for the High Speed Downlink Packet Access is increased as a demand for the dedicated voice, data and/or both integrated voice and data channel decreases and/or the initial allocation of transmit power for the High Speed Downlink Packet Access is decreased as the demand for the dedicated voice channel increases;
   receiving a status signal corresponding to a monitored demand of the at least one base station resource the data transmission service and for the at least another service, wherein the status signal identifies users of the High Speed Downlink Packet Access and/or the dedicated voice, data and/or both integrated voice and data; and
   transmitting a reallocation signal for varying the at least one resource of the base station in response the status signal.

4. A method of communication comprising: measuring a demand of at least one resource for data transmission service and/or for another service; and transmitting the measured demand of the at least one resource for the data transmission service and/or for the another service, wherein the measured demand is initiated and transmitted periodically and/or transmitted in response to the measured demand rising above and/or falling below a threshold, wherein the at least one resource comprises transmit power of a base station, the data transmission service comprises High Speed Downlink Packet Access and the another service comprises at least one dedicated voice, data and/or both integrated voice and data, and wherein the transmit power is initially allocated to the High Speed Downlink Packet Access and the dedicated voice, data and/or both integrated voice and data before the step of measuring a demand.

5. A method of communication comprising: measuring a demand of at least one resource for data transmission service and/or for another service; and transmitting the measured demand of the at least one resource for the data transmission service and/or for the another service, wherein the measured demand is initiated and transmitted periodically and/or transmitted in response to the measured demand rising above and/or falling below a threshold, wherein the at least one resource comprises transmit power of a base station, the data transmission service comprises High Speed Downlink Packet Access and the another service comprises at least one dedicated voice, data and/or both integrated voice and data, and wherein an initially allocated transmit power for the High Speed Downlink Packet Access is increased as the measured demand for the dedicated voice, data and/or both integrated voice and data decreases and/or the initially allocated transmit power for the High Speed Downlink Packet Access is decreased as the measured demand for dedicated voice, data and/or both integrated voice and data increases.

* * * * *